US012586428B2

(12) United States Patent
Wellens

(10) Patent No.: US 12,586,428 B2
(45) Date of Patent: Mar. 24, 2026

(54) RUNNING A TELEMATICS SERVICE VIA A TCU

(71) Applicant: VALEO COMFORT AND DRIVING ASSISTANCE, Créteil (FR)

(72) Inventor: Matthias Wellens, Creteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 166 days.

(21) Appl. No.: 18/569,683

(22) PCT Filed: May 24, 2022

(86) PCT No.: PCT/EP2022/064012
§ 371 (c)(1),
(2) Date: Dec. 13, 2023

(87) PCT Pub. No.: WO2022/263120
PCT Pub. Date: Dec. 22, 2022

(65) Prior Publication Data

US 2024/0282156 A1 Aug. 22, 2024

(30) Foreign Application Priority Data

Jun. 14, 2021 (EP) .................................... 21179293

(51) Int. Cl.
*G07C 5/08* (2006.01)
*G07C 5/00* (2006.01)

(52) U.S. Cl.
CPC ............. *G07C 5/085* (2013.01); *G07C 5/008* (2013.01)

(58) Field of Classification Search
CPC .......... G07C 5/085; G07C 5/008; G07C 5/08; G01K 1/02
See application file for complete search history.

(56) References Cited

U.S. PATENT DOCUMENTS

2012/0254632 A1 10/2012 Saladin et al.
2018/0047219 A1 2/2018 Buswell et al.
2019/0143915 A1* 5/2019 Lei et al. ................ H04W 4/40
2019/0155319 A1 5/2019 Lei et al.
2021/0152639 A1* 5/2021 Madden .................. H04L 67/12

OTHER PUBLICATIONS

International Search Report and Written Opinion in corresponding International Application No. PCT/EP2022/064012, dated Oct. 21, 2022 (10 pages).

* cited by examiner

*Primary Examiner* — Brodie J Follman
(74) *Attorney, Agent, or Firm* — Osha Bergman Watanabe & Burton LLP

(57) ABSTRACT

A method for running a telematics service via a Telematic Control Unit (TCU) of a vehicle is disclosed. The method includes measuring one or more temperatures at the TCU, Comparing the measured temperatures with one or more thresholds, and determining whether or not to run the telematics service depending on a result of the comparison between the measured and threshold temperatures as well as a delay-sensitivity of the telematics service.

12 Claims, 2 Drawing Sheets

RUNNING A TELEMATICS SERVICE VIA A TCU

TECHNICAL FIELD

The disclosure relates to a method for running a telematics service via a Telematic Control Unit of a vehicle, and a system comprising a Telematic Control Unit configured for running a telematics service.

BACKGROUND

Vehicles may often comprise a Telematic Control Unit (TCU) and/or a telematic Electronic Control Unit (telematic ECU) provided on board. Such a TCU is a central component managing numerous functions and communications in a telematics system between a vehicle and external devices or systems, for example vehicle tracking.

Some TCU use cases are limited by resource available at the TCU. Most notably, the communication bandwidth (more generally, communication Quality of Service or QoS) to the outside world, in particular to the Internet and to the OEM (Original Equipment Manufacturer) backend, is limited. Additionally, modern TCUs generate a lot of excess heat that heats up the device and poses the challenge of overheating. Indeed, TCUs leverage silicon chips from the smartphone industry. However, the environmental conditions in the automotive scenario are very different from those of the mobile phone scenario. This makes thermal management of TCUs challenging.

A TCU often implements some countermeasures to prevent possible overheating, such as limiting its own capabilities to reduce self-heating and ensure to stay within supported temperature ranges. Such current solutions are not ideally effective. For example, thermal shutdown may inhibit all the operations entirely at overly high temperature.

Therefore, there is a need for providing more efficient state management of a TCU in a vehicle.

SUMMARY

The disclosure thus provides a method for running a telematics service via a Telematic Control Unit (TCU) of a vehicle. The method comprises:

- measuring one or more Quality of Service (QOS)-impacting variables at the TCU;
- comparing the one or more QoS-impacting variables to one or more thresholds; and
- depending on a result of the comparison and on a delay-sensitivity of the telematics service, determining whether or not to run the telematics service.

According to a first aspect, the one or more QoS-impacting variables may consist of one or more temperatures. As such, the disclosure provides a method for running a telematics service via a TCU of a vehicle which comprises:

- measuring one or more temperatures at the TCU;
- comparing the one or more temperatures to one or more thresholds; and
- depending on a result of the comparison and on a delay-sensitivity of the telematics service, determining whether or not to run the telematics service.

According to a second aspect, the one or more QoS-impacting variables may alternatively consist of one or more communication bandwidths. As such, the disclosure provides a method which comprises measuring, alternatively to the temperatures, one or more communication bandwidths (e.g., successively), and comparing the one or more communication bandwidths to one or more thresholds.

According to a third aspect, the QoS-impacting variables may comprise or consist of any combination or function of one or more temperatures and one or more bandwidths, and/or any other appropriate characteristic or index which is related to the QoS of the communication via the TCU, or more generally the performance or resource availability of the TCU may also be contemplated.

The TCU may comprise one or more sensors or measurement units for performing the measuring step. Alternatively, the vehicle may comprise such sensors or measurement units outside the TCU for performing the measuring step.

The one or more QoS-impacting variables (e.g., temperature) may be measured at one or more different positions at the TCU, and/or at one or more different times so that an average or sum of the measured values may be used for the comparison. The TCU may comprise one or more processors configured for performing the comparing step and/or the determining step. Alternatively, such processor(s) may be remote from the TCU in a vehicle, or outside the vehicle such as in a vehicle OEM backend.

The method enables determining whether or not to run the telematics service according to the QoS-impacting variables of the TCU and the delay-sensitivity of the telematics service, thus facilitating the state management of the TCU.

Optional features of the method are now presented.

The one or more thresholds may consist of several hysteresis thresholds. Namely, the TCU may implement hysteresis thresholding in the comparison.

The method may further comprise determining a state of the TCU, on a scale, based on the comparison. According to the first aspect, the state may be a thermal state of the TCU and the scale may be from a low temperature state to a high temperature state. According to the second aspect, the state may be connectivity state and the scale may be from a low bandwidth state to a high bandwidth state.

The determining of whether or not to run the telematics service may follow a function of the delay-sensitivity and of the state.

Considering the determination to run the telematics service as a high value of the function and, conversely, the determination of not to run the telematics service as a low value of the function, the function may be an increasing function relative to the delay-sensitivity. The function may further be a decreasing function from the low temperature state to the high temperature state, or an increasing function from the low connectivity state to the high connectivity state. That is, it may be more likely to determine to run a telematics service of higher delay-sensitivity, whereas it may be more likely to determine not to run a telematics service of lower delay-sensitivity. It may be more likely to determine to run a telematics service in a lower temperature (or higher connectivity) state, whereas it may be more likely not to run a telematics service in a higher temperature (or lower connectivity) state. The one or more processors (in the TCU or remote from the TCU) may be configured to determine whether or not to run the telematics service corresponding to higher or lower values of the function.

For example, the function is such that, with respect to a first level of delay-sensitivity and to a second level of delay-sensitivity, the second level being lower than the first level, the method determines to run a telematics service when the telematics service has the first level and the thermal state is the high temperature state, whereas the method determines not to run a telematics service when the telematics service has the second level and the thermal state is the high temperature state.

The method may further comprise sharing the determined state with other entities than the TCU. The other entities may be configured to communicate with the TCU. The other entities may be in the vehicle remote from the TCU, and/or in a vehicle OEM backend. The other entities may comprise one or more processors configured to receive the shared state of the TCU.

The sharing may be performed via a publish-subscribe protocol, the other entities being subscribers of the publish-subscribe protocol. The TCU may comprise one or more processors configured to publish its (e.g., thermal or connectivity) state to be shared with the other entities as subscribers.

The method may further comprise periodically re-assessing the delay-sensitivity of the service at one or more subscribers.

The method may further comprise re-assessing at one or more subscribers whether or not to send data to the TCU upon publication of (e.g., thermal or connectivity) state transition of the TCU.

The publish-subscribe protocol may involve a broker. The broker receives one or more messages published by the TCU, the messages being for a topic of the state of the TCU, and distributes them to the subscribers (the other entities) who subscribe to the topic.

The broker may be inside the TCU or remote from the TCU. For example, the broker may run in the TCU, remote from the TCU in the vehicle, or outside the vehicle such as in the vehicle OEM backend.

One or more subscribers of the publish-subscribe protocol may comprise one or more Electronic Control Units (ECUs) of the vehicle and/or one or more entities remote from the vehicle.

The method may be repeated for a plurality of telematics services presenting different levels of delay-sensitivity. The plurality of telematics services may present at least two different levels of delay-sensitivity.

The plurality of telematics services may comprise one or more first telematics services of a first level of delay-sensitivity and one or more second telematics services of a second level of delay-sensitivity, the second level being lower than the first level. The one or more first telematics services may comprise an emergency service, a safety function service, and/or a user-interaction service. Alternatively or additionally, the one or more second telematics services may comprise a maintenance service, a diagnostic function service, a statistics function service, and/or an archiving function service. That is, the one or more first telematics services may be considered as delay-sensitive and the one or more second telematics services may be considered as delay-insensitive, compared to the first telematics services.

The disclosure further provides a method according to a fourth aspect which involves a vehicle (such as an automobile, a motorcycle, or a truck), a TCU of the vehicle, and other entities than the TCU configured to serve a plurality of telematics services, such as one or more ECUs of the vehicle and/or one or more entities remote from the vehicle. The plurality of telematics services comprises one or more first telematics services and one or more second telematics services. For example, the one or more first telematics services comprise an emergency service, a safety function service, and/or a user-interaction service, and/or the one or more second telematics services comprise a maintenance service, a diagnostic function service, a statistics function service, and/or an archiving function service. Optionally, one or more such other entities may each be configured to serve exactly one telematics service and/or one or more such other entities may each be configured to serve several telematics services.

The method according to the fourth aspect comprises, repeatedly through a period of time, measuring one or more status variables of the TCU (e.g., one or more temperatures and/or a bandwidth), comparing the measured variables to one or more thresholds (e.g., optionally, hysteresis thresholds), and, based on the comparison, determining a state (e.g., a thermal state and/or connectivity state) of the TCU (among a predetermined plurality of states, e.g., including a plurality of thermal states and/or a plurality of connectivity states). The method may further comprise repeatedly sharing the determined (e.g., updated) state with the other entities. The method may for example implement a publish-subscribe protocol for such sharing and the other entities may be subscribers of the protocol. Optionally, the publish-subscribe protocol may involve a broker.

The method according to the fourth aspect further comprises, over the period of time, serving at least once each telematics service of the plurality to the TCU, including each first telematics service and each second telematics service. The method comprises serving any first telematics service independently from the TCU state. In other words, the shared TCU state information is never involved or consulted when serving a first telematics service. For example, for each TCU state, the method may serve at least once a first telematics service at a time where the TCU is in said state. Conversely, the method comprises serving any second telematics service depending on the TCU state. For example, for at least one TCU state (e.g., a low QoS state) reached by the TCU over the period of time and at least one second telematics service (e.g., of low delay-sensitivity), the method may comprise not serving (i.e., preventing to serve) the second telematics service while the TCU is in said state, or at least delaying the second telematics service when the TCU is in said state. In particular, the method may comprise receiving a request for serving the second telematics service while the TCU is in said state, and determine not to run the service. Optionally, the method may comprise programming the running of the service at a later time, for example for when the TCU state changes. Yet optionally, the method may further comprise assessing whether the second telematics service has already been delayed (e.g., via a specific attribute stored to convey such information), and deciding to run the service in case the delayal has reached a limit. In other words, the method may optionally run the second telematics service at a time where the TCU state is not appropriate, but having once determined not to run the second telematics service. Alternatively, the method may always prevent running the second telematics service at such a time.

The method according to the fourth aspect may further implement any optional feature of the method according to any of the first to third aspect.

The disclosure also provides a system configured for running a telematics service via a Telematic Control Unit (TCU) of a vehicle according to any above-described method. The system comprises:

the TCU;

one or more temperature sensors for performing the measurement of the one or more temperatures at the TCU; and one or more processors configured for performing the comparison and/or the determining of whether or not to run the telematics service.

The one or more temperature sensors may be in the TCU or remote from the TCU in the vehicle as long as it is configured for performing the measurement of the one or more temperatures at the TCU. The one or more processors may be in the TCU, remote from the TCU in the vehicle, or outside the vehicle such as in the vehicle OEM backend.

The system may further comprise one or more other entities configured to communicate with the TCU, the TCU being configured for sharing a (e.g., thermal or connectivity) state with the one or more other entities.

The other entities may be other processing units (e.g. ECU) in the vehicle and/or outside the vehicle such as in the vehicle OEM background.

The disclosure also provides a Telematic Control Unit (TCU) configured for running a telematics service according to any above-described method. The TCU comprises:

one or more temperature sensors for performing the measurement of the one or more temperatures at the TCU; and one or more processors configured for performing the comparison and/or the determining of whether or not to run the telematics service, and/or for sharing a thermal state with one or more other entities.

The disclosure also provides an entity configured for running a telematics service via a Telematic Control Unit (TCU) of a vehicle according to any above-described method, the entity comprising a communication unit configured for receiving a shared thermal state from a TCU, and one or more processors configured for performing the comparison and the determining of whether or not to run the telematics service.

The disclosure also provides a computer program comprising instructions executable by the above-described TCU so as to run a telematics service according to any above-described method. The TCU may comprise memory having stored thereon the computer program.

The disclosure also provides a computer program comprising instructions executable by the above-described entity configured for running a telematics service, so as to run a telematics service via a Telematic Control Unit (TCU) of a vehicle according to any above-described method. The entity may comprise memory having stored thereon the computer program.

The disclosure also provides a computer readable medium having stored thereon any one of or both the computer programs.

BRIEF DESCRIPTION OF THE DRAWINGS

Examples of the disclosure are now described, in a non-limiting manner and in reference to the accompanying drawings, where.

DETAILED DESCRIPTION

Figure 1:
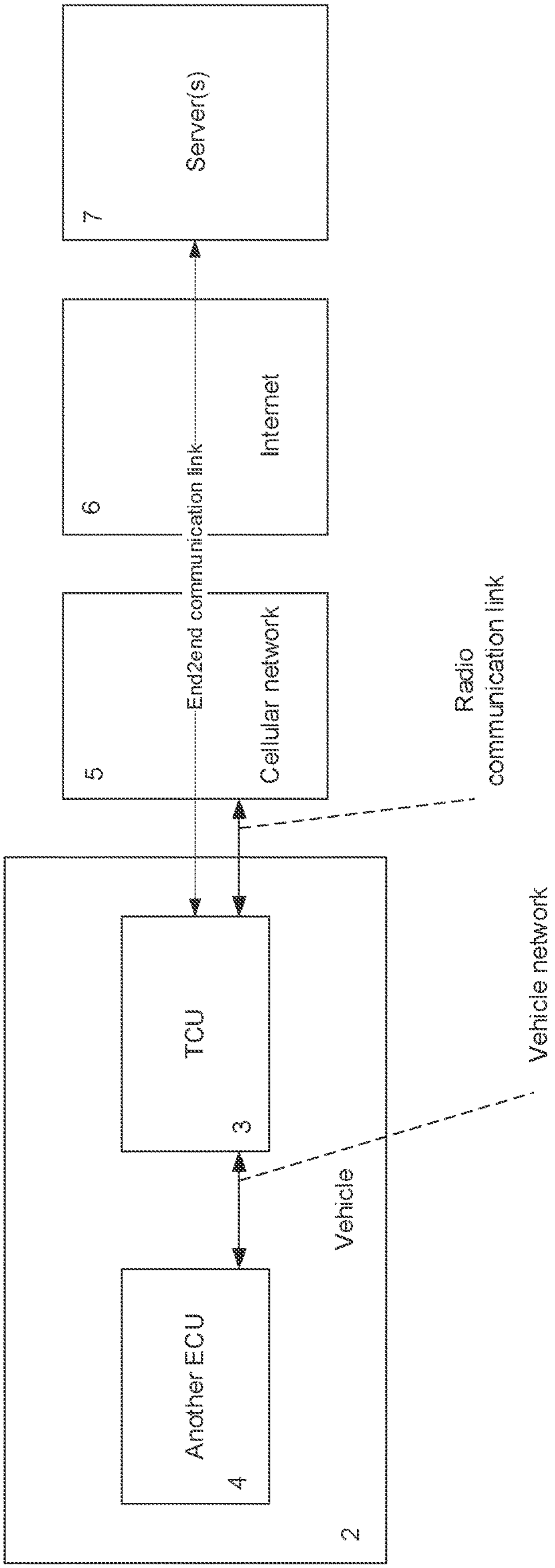
FIG. 1 shows an overview of a vehicle system configured for running a telematics service vie a TCU of a vehicle.

The disclosure proposes a method for running a telematics service via a TCU of a vehicle, and devices and programs configured for performing the method. The method comprises measuring one or more QoS-impacting variables (e.g., temperatures) at the TCU, and comparing the one or more QoS-impacting variables to one or more thresholds. A QoS-impacting variable is any status variable of the TCU which may impact QoS as perceived by a user of a given service. The method further comprises, depending on a result of the comparison and on a delay-sensitivity of the telematics service, determining whether or not to run the telematics service.

This allows to prevent and/or delay transferring data between a vehicle's TCU and other entities, in particular data for (i.e., involved in) running the telematics service on the vehicle, if the telematics service does not need to be ran immediately in scenarios with limited or supposedly limited resource availability of the TCU, e.g., during high temperature scenarios or during scenarios with limited available communication bandwidth.

Some telematics services are of low delay-insensitivity, such as periodic upload of vehicle status data for offline evaluation (e.g., predictive maintenance) or download of non-critical software updates. The method forms a simple procedure to prevent such delay-insensitive data transmissions and/or data transmissions of relatively low delay-sensitivity during limited resource availability scenarios. For instance, in high temperature scenarios, such delaying reduces self-heating of the TCU and thus reduces the need to throttle the TCU functionality or performance. As a result, other more delay-sensitive services do not experience any service degradation.

The term "delay-sensitivity" or "latency-sensitivity" refers to an extent to which a service or data transmission may accept delay or postponement.

The method may be implemented in an environment where TCUs of different vehicles run different telematics services. The vehicle involved in the method, for example a car, a motorcycle, or a truck, may evolve in that environment and have a TCU configured for exchanging data with other entities in order to run telematics services. These other entities may be entities of the vehicle other than the TCU, such as Electronic Control Units (ECUs), or entities (e.g., servers and/or clients) remote from the vehicle.

The telematics services may each have a respective level of delay-sensitivity among a plurality of levels of delay-sensitivities. The method may thus be repeated (e.g., for the same vehicle) for a plurality of telematics services presenting different levels of delay-sensitivity. The telematics services may in particular comprise one or more first telematics services of a first level of delay-sensitivity and one or more second telematics services of a second level of delay-sensitivity, the second level being lower than the first level.

"Delay-sensitivity" is merely an attribute of a telematics service which conditions its execution depending on the result of the comparison step of the method. For example, for a same result of the comparison step of the method (e.g., a same value of the QoS-impacting variables), the method determines for any telematics service of the first level that the service is to be ran, whereas the method determines for any telematics service of the second level that the service is not to be ran. As a result, depending on the result of the comparison and on the delay-sensitivity of a telematics service, the method may run the telematics service without delay, or on the contrary the method may delay or prevent running the telematics service. For example, the method may run any first telematics service (i.e., having the first level of delay-sensitivity) without delay, while the method may delay or prevent running any second telematics service (i.e., having the second level of delay-sensitivity). Thus, "delay-sensitivity" of telematics service corresponds to an extent to which running the service is delayed by the method depending on the result of the comparison step.

By "without delay", it is meant that the method comprises executing an instruction code to initialize the service, and the method effectively starts serving the service within a predetermined (e.g., short) amount of time after the initialization (e.g., within one minute). Conversely, by "delay or prevent", it is meant that the method comprises executing an instruction code to initialize the service, but the service is not executed within said predetermined amount of time (i.e., no serving occurs during said predetermined amount of time). For example, the method may comprise effectively executing an instruction code to stop or pause the service.

In general, the method may comprise determining a QoS state of the TCU, for example based on the comparison step, and the QoS state may take (e.g., at least two) values from a low QoS state (e.g., low bandwidth state or high temperature state) to a high QoS state (e.g., high bandwidth state or low temperature state). In such a case, the determining of whether or not to run the telematics service may follow a function of the delay-sensitivity and the QoS state which is increasing relative to the delay-sensitivity and decreasing from the high QoS value state to the low QoS state (i.e., increasing from the low QoS value state to the high QoS state). It is here considered that the determination to run the telematics service corresponds to a higher value of the function, and that the determination to not run the telematics service corresponds to a lower value of the function. In other words, the method determines to run the telematics service when the telematics service is of high delay-sensitivity and the QoS state is the high QoS state, and the method determines not to run the telematics service when the telematics service is of low delay-sensitivity and the QoS state is the low QoS state. In-between, the result of the determination is progressive (i.e., monotonous) depending on the value of the two variables of the function. By "high" and "low" delay-sensitivity, it is meant respectively a first and second level of delay-sensitivity, the second level being lower than the first level.

In situations with limited communication bandwidth or insufficient QoS, deferring delay-insensitive data transmissions saves the limited communication resources for more delay-sensitive services.

Running the telematics service via the TCU may comprise transmissions from the vehicle to the OEM backend or the Internet as well as transmissions from the backend or the Internet to the vehicle.

The TCU may share its status with interested parties (other ECUs in the vehicle, OEM backend, further Internet nodes, for example). Thus, each interested party may know if the TCU currently faces resource limitations or not. For the example of temperature management, the interested parties may know if the TCU is in or close to overheating conditions. Each party may locally evaluate the TCU status and the urgency of the upcoming transfer and decide whether to postpone the transfer or to move ahead.

Other parties, namely other communication nodes can throttle their communication to prevent further increase of the TCU-internal temperatures. Urgent communication may still continue, whereas delay-insensitive communication may be delayed. Each node decides on its own if and how much communication shall be throttled. A simple and efficient implementation may be to leverage a publish-subscribe-solution such as MQTT. In the publish-subscribe-solution, the TCU may serve as a publisher who publishes one or more messages for a topic of the state of the TCU, and the other parties may serve as subscribers who subscribe to the topic. In this way, the state of the TCU may be shared with other parties. The publish-subscribe-solution may comprise a broker who receives and distributes the published messages.

Specifically, delay-sensitive services such as emergency or safety function, or the end-customer request to active streaming of a web-radio may be carried out. However, delay-insensitive services may be not carried out immediately but rather postponed for later.

Potentially each communication peer (node) may periodically reevaluate the urgency of a pending transfer. It may have waited for quite some time already and cannot afford to wait longer such that it may start the transfer although the TCU is still facing resource shortage or is close to overheating.

If the TCU has no resources available, e.g., since it is out of cellular network coverage or because it is in thermal shutdown, a transmission does not even have to be attempted (apart from an eCall that could also be placed via roaming to other networks).

The method may employ any appropriate algorithm for how each communication peer of the TCU or the vehicle decides upon the urgency of a pending transfer. In other words, delay-sensitivity of a telematics service may be set by the communication peer itself, and the value of the delay-sensitivity may be defined by the decisions made by the communication peer facing different QoS states of the TCU.

In examples, there may be no procedure in place to prevent a communication peer from always moving forward with its communication independently of its delay-sensitivity or to punish such behaviour. In such a case, (e.g., most of) the ECUs in the vehicle and the OEM backend may be under full control of the vehicle OEM such that it can enforce a proper policy on determining the urgency of any pending communication.

Thus, the method and the system prevent unnecessary, namely non-urgent communication in periods of resource shortage (e.g., increased temperature) in the TCU. It enables a better management of priorities across a plurality of telematics services in a vehicle.

In scenarios of resource shortage, the distributed approach to service prioritization is simple and does not reduce QoS below the acceptable level because only delay-insensitive services are deferred in time.

For the example of temperature and heat management, self-heating of the TCU is limited, reducing the probability that the TCU has to lower its functionality or performance in order to reduce self-heating.

It is now referred to the first aspect.

The following example focuses on the thermal state of the TCU and the proposed admission control may help to manage this limitation of TCU's resource availability more efficiently. The same methodology can be applied to manage any other resource of limited supply, too. Another example is communication bandwidth, for example.

FIG. 1 shows an overview of a system 1 configured for running a telematics service via a Telematic Control Unit (TCU) of a vehicle. A TCU 3 may be installed anywhere in a vehicle 2, for example under a roof, in a dashboard, or anywhere else. For example, TCU 3 may be installed under the roof for better signal reception. However, the roof is the part which is exposed most to the sun and the heat from the outside environment. The dashboard also tends to get hot due to the heat from an engine, for example.

Vehicle 2 may comprise one or more another ECU(s) 4 configured to communicate with TCU 3 via a vehicle network 8. TCU 3 is configured to connect vehicle 2 to other entities (i.e., communication nodes) outside vehicle 2 such as an Internet node, a server and/or an OEM backend over a cellular network 5 and/or the Internet 6. One or more server(s) 7 communicates with the TCU via for example End2End communication link and provide telematics services to the vehicle fleet. Server 7 may be a vehicle OEM backend, for example.

Vehicle 2 may comprise one or more suitable sensors or measurement means to obtain one or more temperatures at TCU 3. Such temperature sensors may be integrated in the TCU, or located somewhere else in the vehicle as long as the one or more temperatures for the TCU are appropriately obtained. One or more temperatures are measured at the TCU to determine a thermal state of the TCU. The temperatures may be measured at one or more different positions and/or at one or more different times (consecutively or intermittently) so that an average, a sum, and/or the highest value of the measured temperatures may be used to determine the thermal state of the TCU.

The main communication functionality may be implemented in a software running on a baseband chip of the TCU. As such, the baseband chip may be the hottest point in the system. The baseband chip may have a temperature sensor integrated, which measures the temperature $T_{BB}$ of the baseband chip. At the same time, the silicon technology of the chip and its package determines a maximum junction temperature $T_{j,max}$ which may at maximum be reached before the system may show erroneous behaviour caused by overheating. Thus, $T_{BB}<T_{j,max}$ holds. Although $T_{j,max}$ depends on the implemented silicon technology of the baseband chip, typical values may be 85° C., 95° C., 105° C., 115° C. for example.

The exact location of the temperature sensor inside the baseband chip may depend on the chip-internal architecture, for example so as to ensure that the provided temperature is very close to the hotspot of the system. All thermal management may be based on the sensor readings over time.

By comparing the one or more measured temperature(s) and one or more predetermined temperature thresholds, the method may determine thermal state of the TCU. The method may obtain a single temperature value, or an average or the highest value of a plurality of temperature values over a predetermined period. The comparison step may involve one or more corresponding thresholds accordingly.

As will be explained in detail below, when the determined state of the TCU is a predetermined state, only a telematics service which has a predetermined level of delay sensitivity is to be run and other telematics services may be postponed.

The transition between the different states shall be controlled by temperature measurements of a temperature sensor inside the baseband chip of the modem chipset or other TCU thermal sensors depending on availability.

For example, the method may implement the following temperature thresholds between different thermal states of the TCU:

TABLE 1

| Thermal Mitigation Level | Threshold temperature to activate | Threshold temperature to deactivate | Corresponding thermal state of TCU |
|---|---|---|---|
| Level 1 | 65° C. | 60° C. | "Increased temperature" |
| Level 2 | 75° C. | 70° C. | "Increased temperature - Functionality slightly reduced" |
| Level 3 | 85° C. | 80° C. | "Increased temperature - Functionality reduced" |
| Level 4 | 95° C. | 90° C. | "Significantly increased temperature -Functionality significantly reduced" |

*maximum junction temperature $T_{j,\ max}$ = 105° C.

These threshold values are merely examples. They may further depend on the particular mechanical integration into the vehicle and the airflow inside the TCU.

It is to be noted that the TCU may be located differently in a vehicle, for example in a dashboard or a roof. As such, the threshold values for respective thermal mitigation levels may vary depending on the location of the TCU. The temperature threshold values may be predetermined accordingly.

In an example, the thresholds for transition between different thermal mitigation levels, i.e., different thermal states consist of several hysteresis thresholds. In other words, the method may involve different threshold values for inverse transitions.

Indeed, depending on system configuration, the method may classify different states of the TCU in another way. Instead of the above classification illustrated in Table 1, in the case of a TCU which implements active cooling function, variables "TCU-Thermal-State" to describe its thermal state may be "Normal"/"Increased temperature"/"Active cooling required"/"Thermal shutdown (eCall only)", for example.

The transition thresholds may be set to the same as used for the TCU-internal thermal mitigation strategy. For example, the threshold for transitioning from "Normal" to "Increased temperature" state may correspond to the threshold temperature for the lowest level of thermal mitigation, i.e., the least impacting limitations.

The state "Active cooling required" may be optional and may only be used if the TCU supports active cooling, for example using a fan.

By way of example, the method may involve three or four thermal mitigation levels (thus, corresponding thermal states) of the TCU with respective thresholds in a temperature range of 60-115° C. However, the thermal mitigation levels or thermal states may be allocated in any narrower or broader different range of temperature, as well as further subdivided, for example into five or more.

As known in the art, the TCU may locally apply its own countermeasures and manage the activation/deactivation of these countermeasures. Examples for such countermeasures that are triggered locally at the TCU when entering thermal mitigation may be as follows:

TABLE 2

| Thermal Mitigation Level | TCU local countermeasures |
|---|---|
| Level 1 | No actions |
| Level 2 | Reducing the use of cellular resources (e.g., using only one carrier instead of multiple carriers, i.e., reducing throughput)<br>Applying a backoff for transmission, i.e., enforcing that the system pauses transmission for short periods of time periodically |
| Level 3 | Dropping features, e.g., dropping from 5G to 4G<br>Reducing maximum transmit power (i.e., reducing maximum communication range) |

TABLE 2-continued

| Thermal Mitigation Level | TCU local countermeasures |
|---|---|
| | Activating active cooling (using a fan, for example) |
| Level 4 Right before reaching $T_{j,max}$ | Stopping the communication (i.e., dropping the call) Shutting down the system to prevent damage from overheating (thermal shutdown with the exception of "eCall" where a damage to the TCU may be acceptable because of the safety relevance of the eCall) |

The given mapping of countermeasures to thermal mitigation levels is merely an example. In practice, it may further depend on system configuration.

In addition to the TCU's own local countermeasures being performed, the determined thermal state of the TCU is shared with other entities, i.e., other communication nodes or peers so that the other entities may adapt their behaviour on their own to mitigate the overheating of the TCU. As such, the method may implement a distributed approach with two separate but complementary approaches implemented by the TCU and other entities, independently with each other, to limit TCU overheating.

Figure 2:
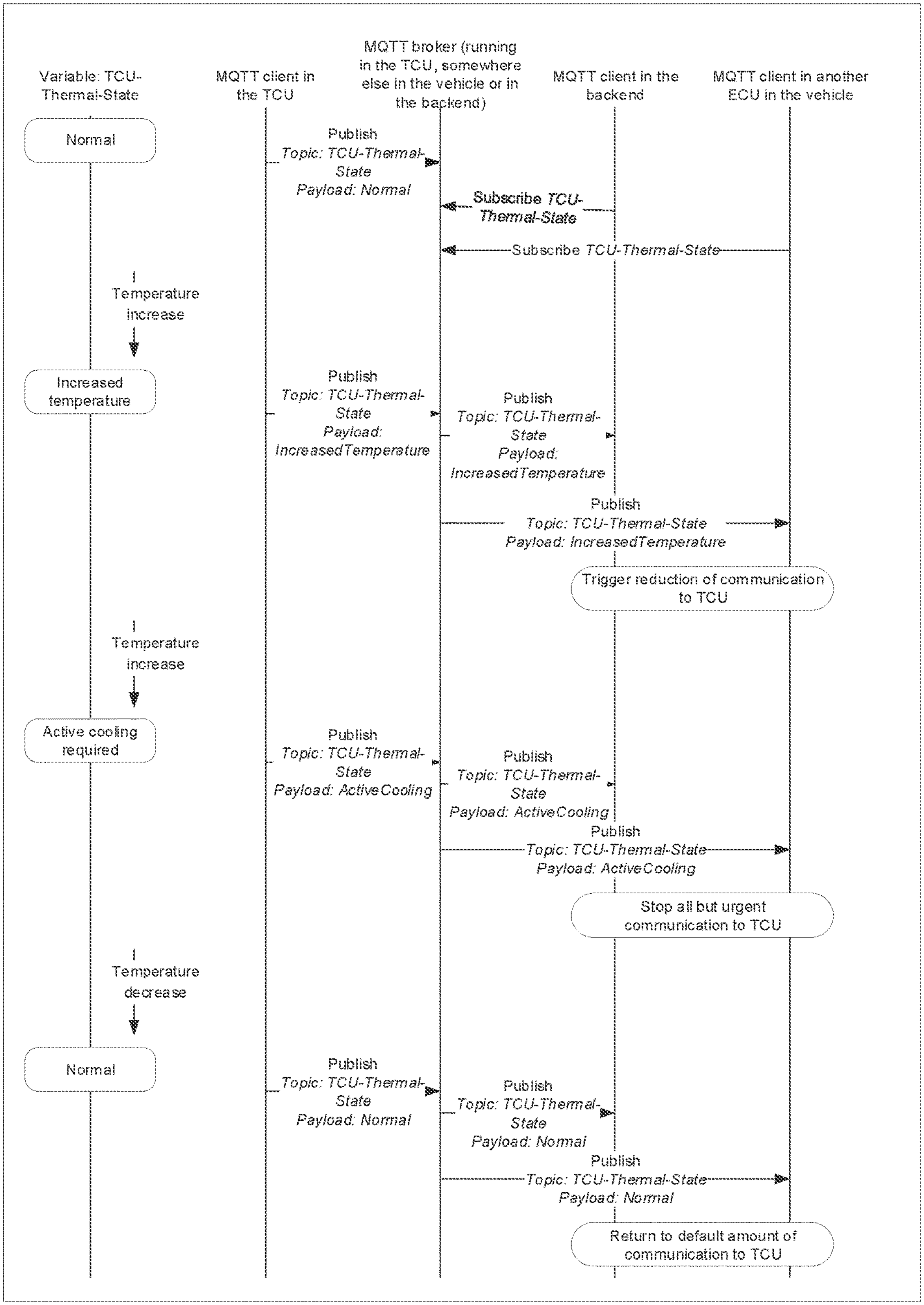
FIG. 2 shows a flowchart of a process of an example thermal state management of the TCU.

The sharing step by such distributed approach is further explained referring to FIG. 2, which shows a flowchart of an example process of the thermal state management.

By way of example, in the scenario of FIG. 2, the thermal state management is implemented based on a publish-subscribe solution, and four thermal states of the TCU are assumed, namely "Normal", "Increased temperature", "Active cooling required", and "Thermal shutdown" (not shown).

As illustrated in FIG. 2, interested nodes such as other ECUs in the vehicle, Internet nodes, or the OEM backend may subscribe to updates of "TCU-Thermal-State" in order to be informed about it. Each node can then decide locally and by using its own algorithms if a communication transfer shall be executed or shall be postponed to allow the TCU to cool down first.

The distribution of updates of "TCU-Thermal-State" may be implemented efficiently using a publish-subscribe-solution such as Message Queuing Telemetry Transport (MQTT), for example. The TCU as an MQTT client publishes the "TCU-Thermal-State" via an MQTT topic and the interested nodes also as MQTT clients simply subscribe to updates of this topic. An MQTT broker takes care of distributing an update published by the TCU to all subscribed MQTT clients.

Such distributed approach using the publish-subscribe solution allows that the TCU itself does not need to know or identify who subscribes to updates of TCU's state, but just simply publishes its updated state. Further clients (communication nodes) may newly join the system and subscribe (thus become a "subscriber") without identification or authentication by the TCU. Further, transmission of messages may not be affected by the status of clients, namely whether each client is on or off. As such, in addition to the TCU's own local countermeasures, each subscriber client may independently decide whether to postpone any delay-insensitive service so as to prevent overheating of the TCU, thus minimizing computational load on TCU side.

A unit which serves as the MQTT broker to receive published messages from the TCU and distribute them to other interested nodes may be integrated in the TCU, may be separate from the TCU somewhere else in the vehicle, or may be outside the vehicle, for example in the OEM backend.

As mentioned above, when the measured temperature of the TCU reaches the predetermined threshold temperature, the thermal state of the TCU is updated, for example from "Normal" to "Increased temperature", or from "Increased temperature" to "Active cooling required", and so on. The TCU as an MQTT client publishes a message for a topic "TCU-Thermal-State" with a payload for its thermal state, for example "Normal" or "IncreasedTemperature". Other interested nodes (such as other ECUs in the vehicle, Internet nodes, or the OEM backend) as MQTT clients who have subscribed to the topic "TCU-Thermal-State" receive the published message via the MQTT broker unit to know the update of the TCU's thermal state. Then, each subscriber decides on its own whether or not to defer delay-insensitive data transmissions based on the TCU's thermal state and the delay-sensitivity of the data transmission.

A possible example for a classification of telematics services in terms of a level of delay-sensitivity may be as follows:

A) High Level of Delay-Sensitivity/Delay-Sensitive Services

- Emergency functions (e.g., eCall): Safety-related and interactive. No delay acceptable.
- Remote operation: remote operating a vehicle is very delay-sensitive for safety reasons
- Music, video, the Internet, social media: Streaming data and social media data is not interactive but the end-customer still expects it to be handled without delay. The networks do usually not give special priority to these services such as to voice services but the vehicle TCU should treat them as very delay-sensitive services.
- Breakdown call: The end-user calls the OEM hotline since he has an issue with his vehicle. The call center operator needs to have access to vehicle details immediately.
- WLAN hotspots: The end-customer expects his data to be handled without delay.
- Providing current traffic details to the vehicle's navigation system
- Mobile office: Same for remote working type of applications.
- Hazard warnings: Further delays are not acceptable due to possible safety implications.
- Automatic environment adjustments to keep drivers alert/Medical assistance: These services may use offline analysis (more computational power, larger AI driven analysis systems). Since the application may be safety related, no additional delay shall be added.

B) Medium Level of Delay-Sensitivity Services

- Parking garage information (occupancy and rates) Usually end-users do not target the last free spot but are more interested in the basic information if spots are available or not. The navigation system also knows early on that parking garage details may be needed before reaching the target area such that the update can be triggered proactively enabling some delay-insensitivity.
- FOTA (firmware-over-the-air): Firmware update over-the-air of particular importance. Assuming the software update is very critical in terms of cybersecurity or safety the update is somewhat delay-sensitive. This is a rare case.

C) Low Level of Delay-Sensitivity/Delay-Insensitive Services

- FOTA: Most software updates are delay-insensitive.

Vehicle condition+service reminders: For sharing this information with the OEM backend and providing reminders back to the end-user a few minutes/hours do not matter.

Predictive maintenance: Offline analysis of the vehicle state by the OEM to provide adaptive service reminders considering the state of the vehicle.

Remote diagnostics: The OEM collects statistics on vehicle status remotely. Related to predictive maintenance but also for other topics such as HMI (Human-Machine Interface) usage analysis.

Optimize fuel consumption: a high-definition (HD) map provides so-called e-horizon that allows the vehicle (e.g., a truck) to optimize fuel consumption (e.g., when to shift gears). Such maps need to be kept up-to-date but do not change frequently.

Toll collection: Systems need to record the route driven in order to properly charge the right amounts but this information may be transferred a bit earlier or later without problem. Similar variations may occur due to other shortcomings of the End2End-communication system (capacity shortage).

The above group A may be related to emergency, safety, and/or end-user interactive functions, in general. The above group B may be related to services prone to change and/or relatively important updates, in general. The above group C may be related to maintenance, diagnostic, statistics and/or archiving functions, in general. For example, a plurality of telematics services to be ran via the TCU may comprise a first group of services from the group A with a first level of delay-sensitivity, and a second group of services from the group C with a second level of delay-sensitivity, the second level being lower than the first level.

If a service needs to transmit data and it belongs to the groups B or C, the shared thermal state of the TCU is checked. If the TCU is too hot, the communication is postponed.

Periodic re-check differentiates groups B and C because both groups only wait for a predetermined maximum timespan before executing the communication anyway, but such maximum timespan may be much longer for group C.

For example, entities executing services belonging to group C postpone service execution as soon as thermal mitigation level 2 is reached. Entities executing services belonging to group B postpone service execution as soon as thermal mitigation level 3 is reached. Entities executing services belonging to group A never postpone service operation.

Considering above examples for thermal mitigation countermeasures applied locally at the TCU, the execution of services belonging to group A may be indirectly postponed when reaching mitigation level 4 because the TCU may shut down its operation.

MQTT clients of the thermal admission may have predetermined tables of a level of delay-sensitivity per service. Each MQTT client may have a predetermined mapping table between different levels of delay-sensitivity of services and the TCU's thermal states.

Although there have been presented three categories for a level of delay-sensitivity A, B and C above, there may be two, four, five or any other numbers of categories for a level of delay-sensitivity according to different criteria. On the side of each MQTT client, the mapping or categories of delay-sensitivity level may be reevaluated and updated accordingly over time. Namely, a telematics service may be reevaluated for its level of delay-sensitivity and moved from one category to another one, for example from B to C. Or more broadly, some or all services in one category of delay sensitivity level (e.g. group B) which has been first associated with e.g. the thermal mitigation level 3 may be reevaluated and associated to the different thermal mitigation level, for example level 2, depending on the actual traffic condition of the entire system.

As the temperature of the TCU decreases (maybe after the active cooling and/or throttling of the performance), the TCU's thermal state may be updated, for example from "Active cooling required" to "Normal". Every time the thermal state is updated, the TCU publishes such update, or the TCU may periodically evaluate and publish its thermal state.

The other entities as subscribers may periodically re-assess the level of delay sensitivity of the respective services on their own. Further, the other entities as subscribers may re-assess whether or not to defer the data transmission for running the telematics service with the TCU upon publication of the update of the thermal state of the TCU (i.e., the transition of the thermal state of the TCU).

The respective services may postpone the data transmission for running the telematics service for a predetermined time limit. Namely, after the expiry of the predetermined time limit, the service may no longer accept any further deferment but push forward the data transmission anyway regardless of the thermal states of the TCU at that time. Further, the respective services may decide whether or not to still postpone the data transmission every time it rechecks the current thermal state of the TCU.

In this way, the other entities know the TCU's thermal state so as to react promptly to TCU's thermal state transition in an effective manner for mitigating any overheating of the TCU. This enables an efficient management of priorities across a plurality of telematics services in a vehicle, and thus an efficient state management of the TCU in a vehicle.

The first aspect of the telematics service running has been discussed. The discussion applies equivalently to the second aspect. For example, the communication bandwidth may be used alternatively to the temperature for assessing the TCU's state. Yet alternatively, the first and second aspects may be combined. For example, both temperatures and bandwidths may be compared to respective thresholds and the TCU's state may be determined based on both results of comparison.

Indeed, although the above focused on thermal state management of the TCU, the method also applies to other type of QoS management of the TCU. That is, other suitable variables indicating the QoS states or resource availability of the TCU may be contemplated. Similar to the thermal state management of the TCU, such TCU's states are shared with other entities which decide on their own whether to defer or postpone the service depending on the TCU's state and delay-sensitivity of the service.

REFERENCE NUMERALS

1 Vehicle System
2 Vehicle
3 TCU (Telematic Control Unit)
4 Another component in a vehicle (ECU, for example)
5 Cellular network
6 Internet
7 Server (vehicle OEM backend, for example)

The invention claimed is:

1. A method for running a telematics service via a Telematic Control Unit (TCU) of a vehicle, the method comprising:

measuring one or more temperatures at the TCU;

comparing the one or more measured temperatures to one or more thresholds;

depending on a result of the comparison between the measured temperatures and the thresholds, and on a delay-sensitivity of the telematics service, determining whether or not to run the telematics service;

determining a thermal state of the TCU, from a low temperature state to a high temperature state, based on the comparison between the measured temperatures and the thresholds;

sharing, via a publish-subscribe protocol, the determined thermal state with other entities that are subscribers of the publish-subscribe protocol; and periodically re-assessing the delay-sensitivity of the service at one or more subscribers.

2. The method of claim 1, wherein the one or more thresholds consist of several hysteresis thresholds.

3. The method of claim 1, wherein the determining of whether or not to run the telematics service follows a function of the delay-sensitivity and of the thermal state, with respect to a first level of delay-sensitivity and to a second level of delay-sensitivity, wherein the second level of delay-sensitivity is lower than the first level of delay-sensitivity, wherein, in the function, the method determines to run a telematics service when the telematics service has the first level of delay-sensitivity and the thermal state is the high temperature state, and wherein the method determines not to run a telematics service when the telematics service has the second level of delay-sensitivity and the thermal state is the high temperature state.

4. The method of claim 1, further comprising re-assessing at one or more subscribers whether or not to send data to the TCU upon publication of thermal state transition of the TCU.

5. The method of claim 1, wherein the publish-subscribe protocol involves a broker.

6. The method of claim 5 wherein the broker is inside the TCU or remote from the TCU.

7. The method of claim 1, wherein one or more subscribers of the publish-subscribe protocol comprise one or more Electronic Control Units (ECUs) of the vehicle and one or more entities remote from the vehicle.

8. The method of claim 1, wherein the method is repeated for a plurality of telematics services presenting different levels of delay-sensitivity.

9. The method of claim 8, wherein the plurality of telematics services comprises one or more first telematics services of a first level of delay-sensitivity and one or more second telematics services of a second level of delay-sensitivity, wherein the second level of delay-sensitivity is lower than the first level of delay-sensitivity, wherein the one or more first telematics services comprise an emergency service, a safety function service, and/or a user-interaction service, and wherein the one or more second telematics services comprise a maintenance service, a diagnostic function service, a statistics function service, and/or an archiving function service.

10. A system configured for running a telematics service via a Telematic Control Unit (TCU) of a vehicle according to the method of claim 1, the system comprising:

the TCU;

one or more temperature sensors for performing the measurement of the one or more temperatures at the TCU; and one or more processors configured for performing the comparison between the measured temperatures and the thresholds and the determining of whether or not to run the telematics service.

11. The system of claim 10, further comprising one or more other entities configured to communicate with the TCU, wherein the TCU is configured for sharing a thermal state with the one or more other entities.

12. A Telematic Control Unit (TCU) configured for running a telematics service according to the method of claim 1, the TCU comprising:

one or more temperature sensors for performing the measurement of the one or more temperatures at the TCU; and one or more processors configured for performing the comparison between the measured temperatures and the thresholds and for determining of whether or not to run the telematics service, and for sharing a thermal state with one or more other entities.

* * * * *